(12) United States Patent
Nee et al.

(10) Patent No.: US 8,941,346 B2
(45) Date of Patent: Jan. 27, 2015

(54) SWITCHING FREQUENCY MODULATION UTILIZING ROTOR POSITION

(71) Applicants: Brett Nee, Germantown Hills, IL (US); Joshua Williams, Peoria, IL (US)

(72) Inventors: Brett Nee, Germantown Hills, IL (US); Joshua Williams, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 57 days.

(21) Appl. No.: 13/664,596

(22) Filed: Oct. 31, 2012

(65) Prior Publication Data

US 2014/0117900 A1    May 1, 2014

(51) Int. Cl.
 *H02P 6/00* (2006.01)

(52) U.S. Cl.
 USPC ............... 318/701; 318/400.14; 318/400.26; 318/400.27; 318/400.28; 318/400.29; 388/805; 388/814; 388/832

(58) Field of Classification Search
 CPC .............................. H02P 25/08; H02K 29/12
 USPC ............ 318/701, 721, 799, 801, 807, 400.01, 318/432, 437, 400.38, 400.39, 400.4, 318/400.26, 400.27, 400.28, 400.29, 430, 318/727; 388/805, 814, 832, 907.2, 908
 See application file for complete search history.

(56) References Cited

U.S. PATENT DOCUMENTS

| 3,679,953 A | | 7/1972 | Bedford |
| 4,707,650 A | | 11/1987 | Bose |
| 4,883,999 A | * | 11/1989 | Hendershot ............ 310/216.071 |
| 5,565,752 A | * | 10/1996 | Jansen et al. ................. 318/807 |
| 5,675,231 A | * | 10/1997 | Becerra et al. ............... 318/801 |
| 5,923,141 A | | 7/1999 | McHugh |
| 5,998,945 A | * | 12/1999 | Elliott ........................ 318/254.1 |
| 6,008,615 A | | 12/1999 | Sugden |
| 6,351,048 B1 | | 2/2002 | Schob et al. |
| 6,351,094 B1 | | 2/2002 | Green |
| 6,469,468 B1 | * | 10/2002 | Hatsuda et al. .............. 318/701 |
| 7,250,734 B1 | | 7/2007 | Iannello et al. |
| 7,327,587 B2 | * | 2/2008 | Mhaskar et al. ............... 363/37 |
| 7,804,269 B2 | * | 9/2010 | Randall ....................... 318/701 |
| 2002/0063547 A1 | | 5/2002 | Turner et al. |
| 2007/0075672 A1 | | 4/2007 | McClelland |

FOREIGN PATENT DOCUMENTS

| EP | 1385263 | 1/2004 |
| JP | 2010081782 | 4/2010 |

OTHER PUBLICATIONS

Peng Zhang, et al. "A Novel FPGA Based Off-line Control Strategy for SRM Integrated Vehicle Propulsion System", Department of Electrical and Computer Engineering, Concordia University, Montreal, Quebec, Canada.

(Continued)

*Primary Examiner* — Antony M Paul
(74) *Attorney, Agent, or Firm* — Miller, Matthias & Hull (57) ABSTRACT

A control system (128) for controlling a switched reluctance (SR) machine (110) having a rotor (116) and a stator (118) is provided. The control system (128) may include a converter circuit (122) operatively coupled to the stator (118) and including a plurality of switches (132) in selective communication with each phase of the stator (118) and a controller (130) in communication with each of the stator (118) and the converter circuit (122). The controller (130) may be configured to determine a position of the rotor (116) relative to the stator (118), and generate a modulated switching frequency (152) based on the rotor position.

20 Claims, 5 Drawing Sheets

(56) References Cited

OTHER PUBLICATIONS

S. Vijayan, et al. "Intelligent speed controller for a Switched Reluctance Motor drive using FPGA", International Journal of Intelligent Systems Technologies and Applications, vol. 7, Issue 4, Sep. 2009, pp. 414-429, Geneva, Switzerland.

Kjaer, P.C., et al. "Very high bandwidth digital current controller for high-performance motor drives", pp. 185-190, Speed Laboratory, University of Glasgow, UK.

* cited by examiner

SWITCHING FREQUENCY MODULATION UTILIZING ROTOR POSITION

TECHNICAL FIELD

The present disclosure relates generally to switched reluctance (SR) machines, and more particularly, to systems and methods of controlling the switching frequency of SR machines.

BACKGROUND

With the growing interest in energy conservation, increasingly more machines, such as mobile industrial work machines or stationary power generation machines, are supplied with electric drive assemblies or systems for operating various tools or functions of the machine. Ongoing developments in electric drives have made it possible for electrically driven machines to effectively match or surpass the performance of mechanically driven machines while requiring significantly less fuel and overall energy. As electric drives become increasingly more commonplace with respect to such machines, the demand for more efficient generators and techniques for controlling same has also increased.

Among the various types of electrically driven machines available for use with such electric drives, switched reluctance (SR) machines have received great interest for being robust, cost-effective, and overall, more efficient. An SR machine is typically used to convert mechanical power received from a primary power source, such as a combustion engine, into electrical power for performing one or more operations of the machine. Additionally, an SR machine may be used to convert electrical power stored within a common bus or storage device into mechanical power. SR machines can similarly be used in conjunction with other generic power sources, such as batteries, fuel cells, and the like. Still further, SR machines can also be used with stationary machines having conventional power sources such as windmills, hydroelectric dams, or any other generic power source commonly used for stationary applications.

A typical SR machine essentially includes a multi-phase stator that is electrically coupled to an electric drive circuit, and a rotor that is rotatably positioned within the stator. In a generating mode of operation, the electric drive may be configured to receive any electrical power which may be induced by mechanical rotations of the rotor relative to the stator. Alternatively, in a motoring mode of operation, the electric drive may be configured to selectively source current through the phases of the stator so as to cause electromagnetic interactions between the stator and rotor poles and rotate the rotor relative to the stator at a desired torque and/or speed. More specifically, the current through each phase of the stator is typically pulsed or chopped by gates or switches of the electric drive at a predefined rate or switching frequency.

Using conventional techniques, however, often results in inconsistent levels of current or uneven current ripple in the pulsed phase current. As current ripple in the phase current directly affects the electromagnetic interactions between the stator and rotor poles, current ripple also leads to undesirable machine behavior and performance. In some modifications, the switching frequency was permanently increased to help mitigate current ripple. However, the amount of increase in the switching frequency needed to sufficiently overcome the adverse effects of current ripple has been found to be too large and burdensome to the SR machine. Specifically, such increases in switching frequency have been found to exhibit undesirable increases in power loss of the electric drive.

Accordingly, there is a need for improved SR machine controls which overcome the deficiencies identified above and reduce power losses in the electric drive. Specifically, there is a need to reduce current ripple in the chopped current supplied to each phase of SR machines without significantly increasing the switching frequency to offset the current ripple.

SUMMARY OF THE DISCLOSURE

In one aspect of the present disclosure, a control system for controlling a switched reluctance SR machine having a rotor and a stator is provided. The control system may include a converter circuit operatively coupled to the stator and including a plurality of switches in selective communication with each phase of the stator, and a controller in communication with each of the stator and the converter circuit. The controller may be configured to determine a position of the rotor relative to the stator, and generate a modulated switching frequency based on the rotor position.

In another aspect of the present disclosure, a method of controlling a switching frequency of a switched reluctance SR machine having a rotor and a stator is provided. The method may determine a position of the rotor relative to the stator wherein the rotor position is indicative of machine inductance, and modulate the switching frequency based on the rotor position such that the switching frequency decreases when machine inductance increases and increases when machine inductance decreases.

In yet another aspect of the present disclosure, a method of controlling a switched reluctance SR machine having a rotor and a stator is provided. The method may determine a position of the rotor relative to the stator, generate a switching frequency based on the rotor position, generate a pulse width modulated PWM phase current signal based on the switching frequency and a current reference signal, and control at least one phase of the stator based on the PWM phase current signal.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
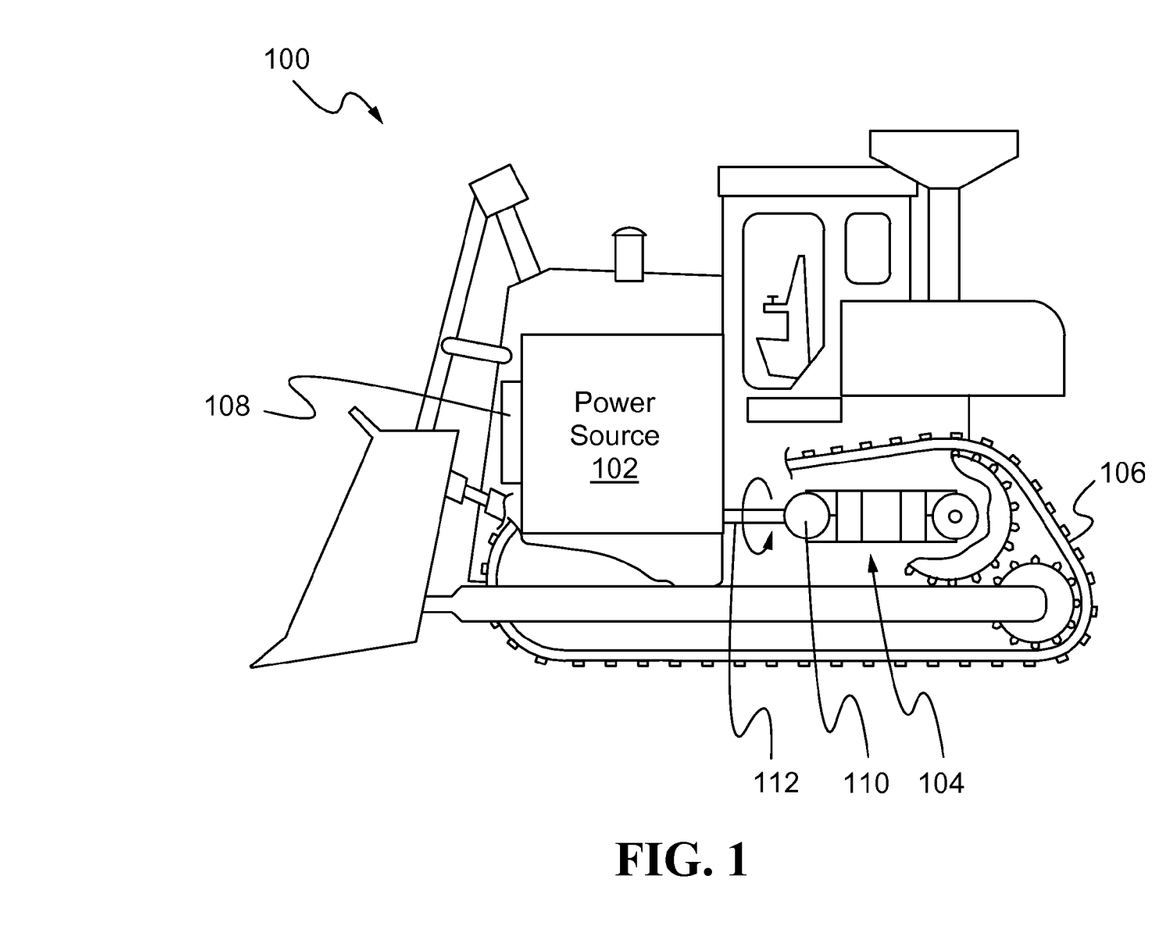
FIG. 1 is a diagrammatic view of one exemplary machine having an electric drive.

FIG. 1 diagrammatically illustrates one exemplary embodiment of a machine 100 that may employ electric drive means to generate electrical energy from mechanical energy or vice versa. In the particular embodiment of FIG. 1, for instance, the machine 100 may include a power source 102 coupled to an electric drive 104 for causing movement via a traction device 106. Moreover, the power source 102 may be configured to mechanically transmit power to an electric machine 110, such as a motor/generator, or the like, of the electric drive 104 via a coupling or axially rotating drive shaft 112. Such mobile machines 100 may be used as a work machine for performing a particular type of operation associated with an industry, such as mining, construction, farming, transportation, or any other suitable industry known in the art. For example, the mobile machine 100 may be an earth moving machine, a marine vessel, an aircraft, a tractor, an off-road truck, an on-highway passenger vehicle, or the like. In general, the power source 102 of the electric drive 104 may include, for example, a combustion engine, such as a diesel engine, a gasoline engine, a natural gas engine, or the like. In alternative applications, the machine 100 may similarly be used in conjunction with other generic types of power sources, such as batteries, fuel cells, and the like. Furthermore, while the machine 100 of FIG. 1 may be illustrated as being mobile, the machine 100 may also be used to generate power in conjunction with stationary applications having, for instance, windmills, hydro-electric dams, or any other suitable means as a power source.

Figure 2:
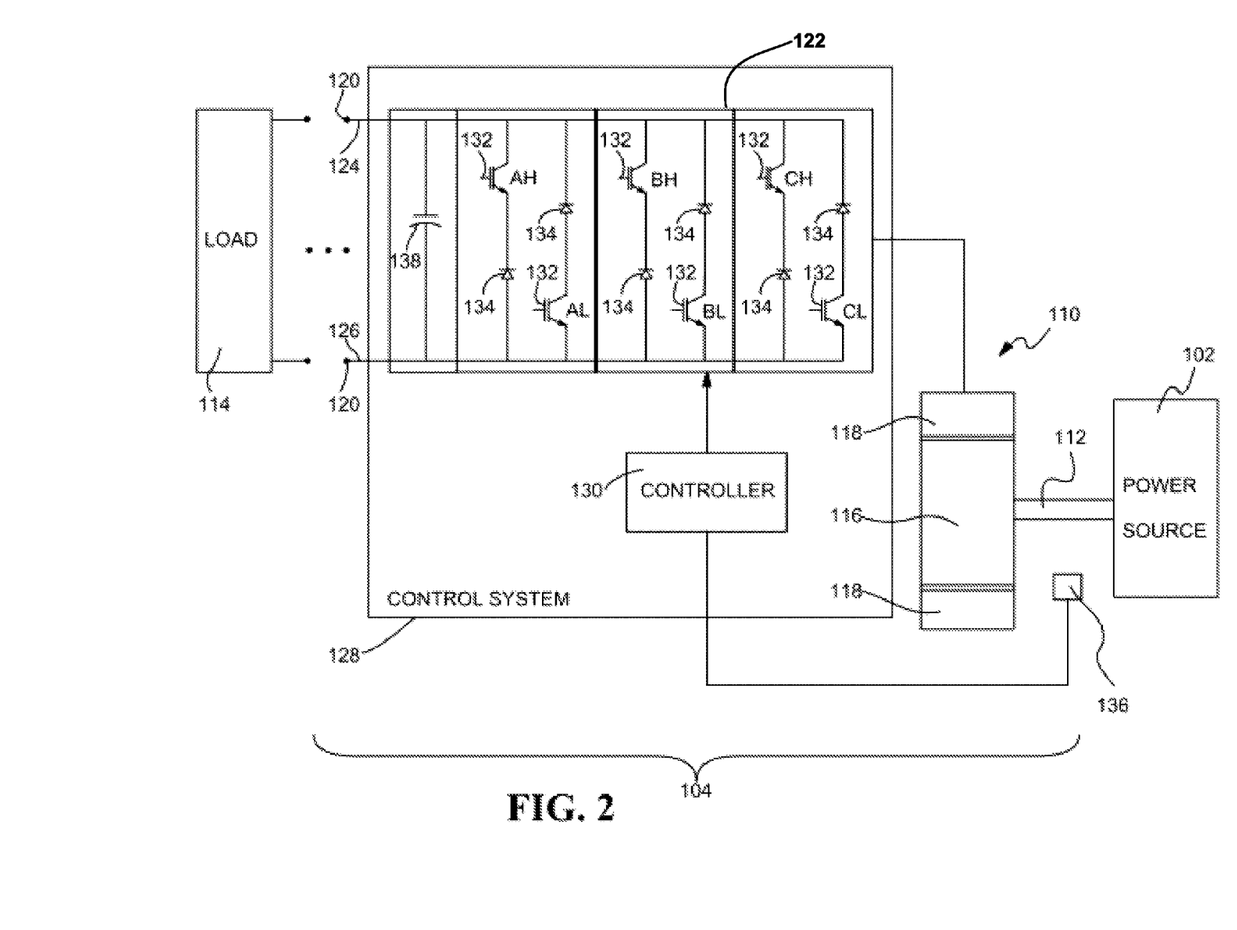
FIG. 2 is a schematic view of one exemplary control system for controlling a switched reluctance (SR) machine constructed in accordance with the teachings of the present disclosure.

FIG. 2 schematically illustrates one exemplary electric drive 104 that may be employed to transfer power between the power source 102 and one or more electrical loads 114. The electric machine 110 of the electric drive 104 in FIG. 2 may be a switched reluctance (SR) machine, or the like, configured to produce electrical power in response to rotational input from the power source 102 and communicate the electrical power to one or more electrical loads 114 of the machine 100. The load 114 may include, for example, motors for causing motion of the machine 100 as well as motors for operating various mechanical tools of the machine 100. As is well known in the art, the SR machine 110 may include a rotor 116 that is rotatably disposed within a fixed stator 118. The rotor 116 may be coupled to an output of the power source 102 via the drive shaft 112, or in other related embodiments, via a direct crankshaft, a gear train, a hydraulic circuit, and the like. The stator 118 may be electrically coupled to a common bus 120 of the electric drive 104 via a converter circuit 122.

During a generating mode of operation, as the rotor 116 is rotated within the stator 118 by the power source 102, electrical current may be induced within the stator 118 and supplied to the converter circuit 122. The converter circuit 122 may in turn convert the electrical signals into an appropriate direct current (DC) voltage for distribution to the various electrical loads 114 of the machine 100. Additionally, the SR machine 110 may be enabled to cause rotation of the rotor 116 in response to electrical signals that are provided to the stator 118 from the common bus 120, for instance, during a motoring mode of operation. The common bus 120 may include a positive line 124 and a negative or ground line 126 across which a common DC bus voltage may be communicated to one or more loads 114 of the machine 100 coupled thereto. For instance, the converter circuit 122 may provide a DC signal to be transmitted through the common bus 120 and to a rectifier circuit where the DC voltage may be converted into the appropriate alternating current (AC) signals for driving the one or more traction motors, or the like, for causing motion of the machine 100 via the traction device 106. The common bus 120 may also communicate the common DC voltage to other loads 114 of the machine 100, such as components of a hybrid system, electrically driven pumps, electrically driven fans, and the like.

Still referring to FIG. 2, the electric drive 104 may also include a control system 128 for controlling the SR machine 110, which may further include a controller 130 that is in communication with at least the converter circuit 122 associated with the electric drive 104. The converter circuit 122 may include a series of transistors or gated switches 132, such as insulated-gate bipolar transistors, and diodes 134 for selectively enabling or chopping current sourced to one or more phase windings of the SR machine 110. A three-phase SR machine 110, for example, may be driven using a converter circuit 122 having six switches 132 and six diodes 134 for selectively chopping current through the three phase legs of the SR machine 110. Each of the switches 132 may be enabled or disabled via gate signals, which may be sourced by the controller 130. In particular modifications, the control system 128 may also be provided with encoders or sensors 136, such as rotor position sensors, rotor speed sensors, or the like, adapted to generate sensor signals corresponding to the rotational speed and/or position of the rotor 116 relative to the stator 118 and communicate the sensor signals to an input of the controller 130. The sensors 136 may include a variable reluctance sensor, a capacitance sensor, a Hall-effect sensor, an anisotropic magnetoresistance sensor, or the like. The sensors 136 may also include means for measuring any one or more of the bus voltage, the phase current through the phases of the stator 118, and the like. In further alternative modifications, any one or more of the rotor speed, the rotor position, the rotor flux, the bus voltage and the phase current may be estimated or derived through sensor-less means by the controller 130 rather than measured. Power to the control system 128 and the converter circuit 122 may be provided by an external or a secondary power source, such as provided by a battery (not shown), residual voltage stored in a capacitor 138 of the common bus 120, or any other suitable current-limited DC power supply.

The controller 130 of FIG. 2 may be implemented using one or more of a processor, a microprocessor, a microcontroller, Field Programmable Gate Array (FPGA), Digital Signal Processor (DSP), an electronic control module (ECM), an electronic control unit (ECU), or any other suitable means for providing electronic control to the electric drive system 104. More specifically, the controller 130 may be configured to operate the SR machine 110 of the electric drive 104 according to predetermined algorithms or sets of instructions designed to optimize the performance of the machine 100 based on one or more observed characteristics of the SR machine 110, the engine 102, the electric drive 104, and the like. The controller 130 may observe, for example, the rotor speed, the rotor position, the rotor flux, the load on the electric drive system 104 and/or SR machine 110, the phase or machine current through each phase of the stator 118, and the like. Based on different combinations of parameters that are observed at any moment during operation, the controller 130 may be able to determine the most appropriate scheme for operating the SR machine 110 and the converter circuit 122 in an efficient and an effective manner.

Figure 3:
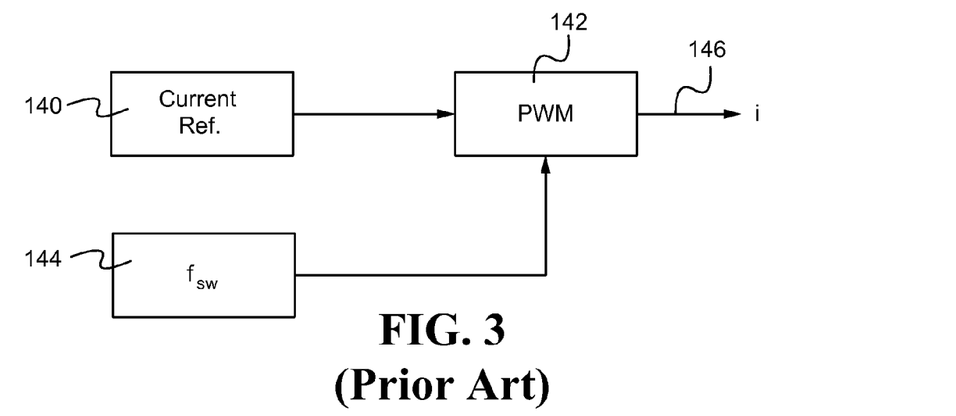
FIG. 3 is a schematic view of one prior art embodiment for generating a phase current.

During certain modes of operation, such as during a motoring mode of operation, the controller 130 may be configured to source pulsed or chopped current to each phase of the stator 118 by engaging the switches 132 at a set switching frequency. As shown in FIG. 3, for example, a current reference signal 140 may be pulsed by a pulse width modulation (PWM) controller 142 according to the switching frequency 144 by means conventionally used in the art so as to generate the PWM signal or chopped phase current 146, as graphically illustrated in FIG. 4 for instance. As shown, the switching frequency 144 may remain substantially constant relative to the rotor position, 8, and to machine inductance 148. Using such a control scheme, however, may result in uneven or inconsistent current ripples, as shown by the pulses of the phase current 146 of FIG. 4. Specifically, in the presence of a constant switching frequency 144, rotor positions exhibiting greater machine inductance 148 may cause smaller current ripples in the resulting phase current, and rotor positions exhibiting lower machine inductance 148 may cause larger current ripples. When applied to each phase of the stator 118, these inconsistent current ripples may cause the SR machine 110 to exhibit undesirable machine behavior and performance. Increasing the switching frequency 144 may render the current ripples relatively negligible to the SR machine 110 and thus help overcome some of the adverse effects to machine performance. However, doing so may also place a significant burden on the associated electric drive 104, which may further lead to substantial losses in power.

Figure 5:
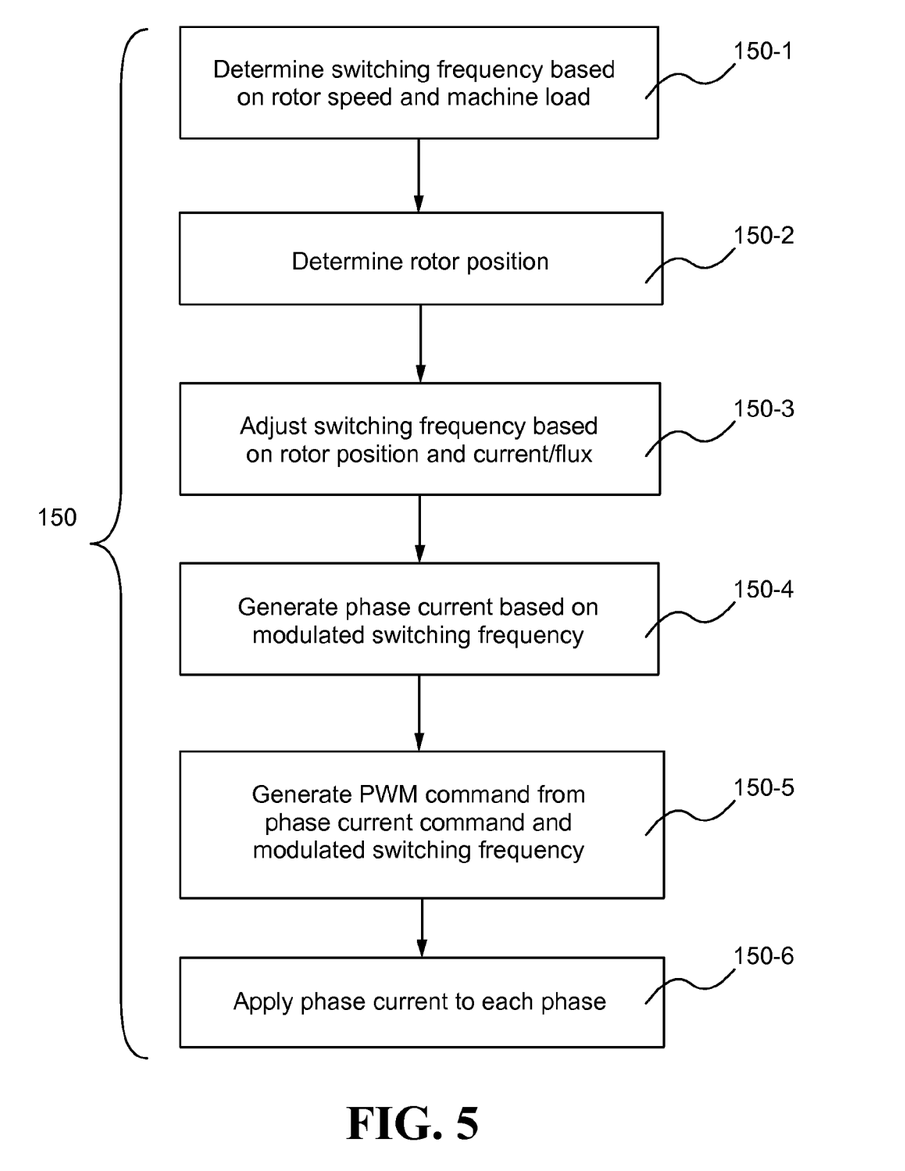
FIG. 5 is a diagrammatic view of one exemplary method of controlling the switching frequency of an SR machine.

Turning to FIG. 5, a flow diagram of one exemplary algorithm or method 150 that may be used to alleviate the undesirable effects of current ripple without significantly increasing the switching frequency is provided. Specifically, the method 150 may be used to configure the controller 130 to source a switching frequency which varies according to one or more of machine inductance, rotor position and rotor flux in a manner which compensates for uneven current ripples in the phase current. As shown in FIG. 5, the controller 130 may initially determine a desired switching frequency that is most appropriate for the rotor speed and machine load during step 150-1. In particular, the controller 130 may be configured to determine the rotor speed and the load on the SR machine 110 through one or more of the sensors 136, derivations, sensor-less means, or the like, and determine the optimum rate at which to engage the switches 132 of each phase based on the observed rotor speed and machine load. Once a desired switching frequency has been established, the controller 130 may proceed to step 150-2 to begin adjusting the switching frequency according to observed changes in the position of the rotor 116 relative to the stator 118.

As shown in step 150-2 of FIG. 5, the controller 130 may be configured to first determine the rotor position, or the position of the rotor 116 relative to the stator 118. The controller 130 may determine the rotor position using one or more of the sensors 136 associated therewith. For example, the rotor position may be determined by proximity and/or encoder-based sensors 136 disposed in communication with the rotor 116 and/or the drive shaft 112 coupled thereto. The rotor position may additionally or alternatively be derived or determined through sensor-less means commonly used in the art. The rotor position determined in step 150-2 may be indicative of machine inductance 148, and thus, may be used by the controller 130 to determine at least when the machine inductance 148 is generally increasing or decreasing. As previously discussed with respect to FIG. 4, fluctuations in the machine inductance 148 may directly correspond to the unevenness of the current ripples in the resulting PWM signal or phase current 146. Thus, based on the rotor position, rotor flux and/or machine current, the controller 130 in step 150-3 may be configured to adjust the switching frequency to compensate for uneven current ripples caused by fluctuations in machine inductance 148.

Figure 4:
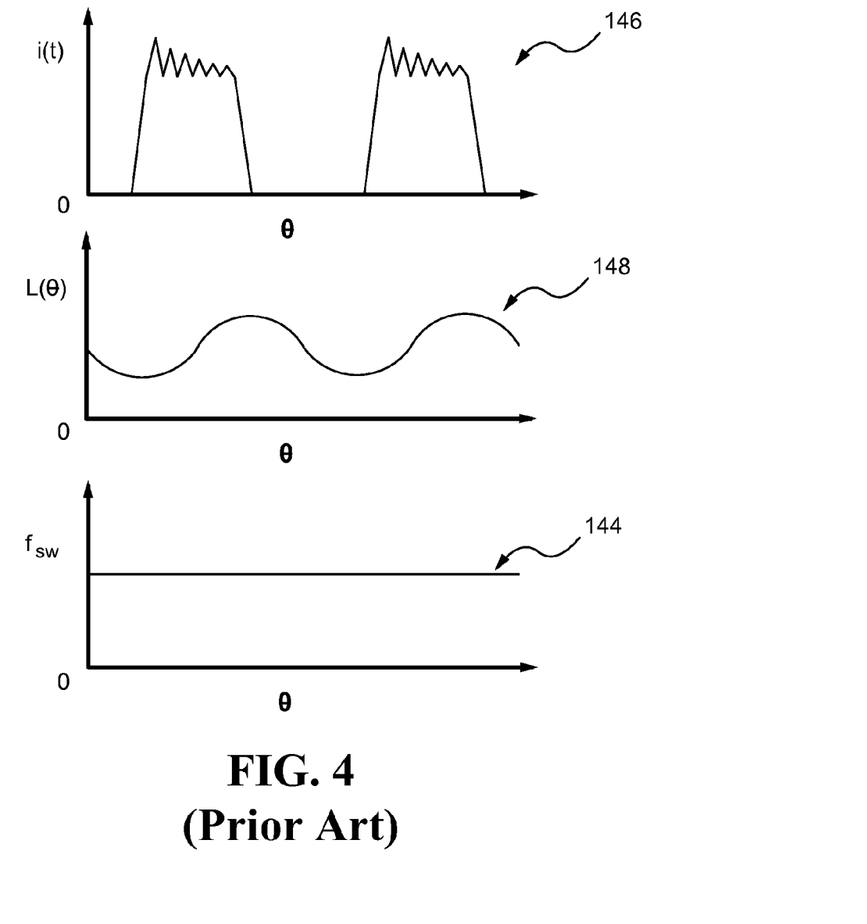
FIG. 4 are graphical views of the phase current, machine inductance and switching frequency as exhibited by the prior art embodiment of FIG. 3.
Figure 6:
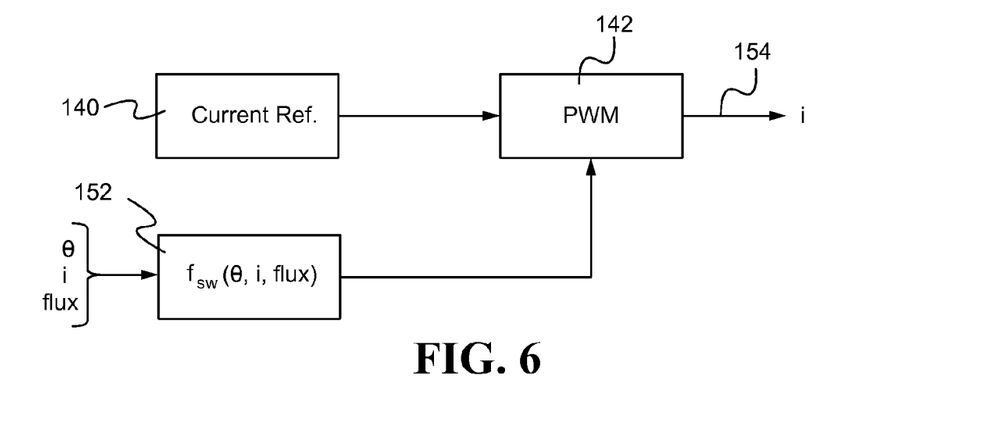
FIG. 6 a schematic view of one exemplary embodiment employing the method of FIG. 5 for generating a phase current.

As shown in FIG. 6, for example, the controller 130 may be configured with a PWM controller 142 designed to pulse or chop the current reference signal 140 using a switching frequency 152 which varies as a function of the rotor position, 8, rather than a constant switching frequency 144 as in FIGS. 3 and 4. The switching frequency 152 may also vary as a function of the phase current, i, or rotor flux, where phase current corresponds to rotor flux and where rotor flux corresponds to machine inductance 148, for instance, as a function of rotor position and phase current. As further shown in FIG. 7, the controller 130 may be configured to generate a modulated switching frequency 152, or modulate a given switching frequency 152, such that the switching frequency 152 decreases when the machine inductance 148 generally increases, and increases when the machine inductance 148 generally decreases. Furthermore, while the switching frequency 152 may be varied, fluctuations in the switching frequency 152 may be constrained so as to provide an overall average switching frequency which substantially approximates the desired switching frequency determined based on rotor speed and machine load during step 150-1. Moreover, the switching frequency 152 may be varied according to a predefined function of rotor position, phase current and/or rotor flux that is programmed within a memory of the controller 130. The switching frequency 152 may also be generated or adjusted based on preprogrammed lookup tables and/or maps which associate ideal switching frequencies for different possible rotor positions for the given SR machine 110.

Figure 7:
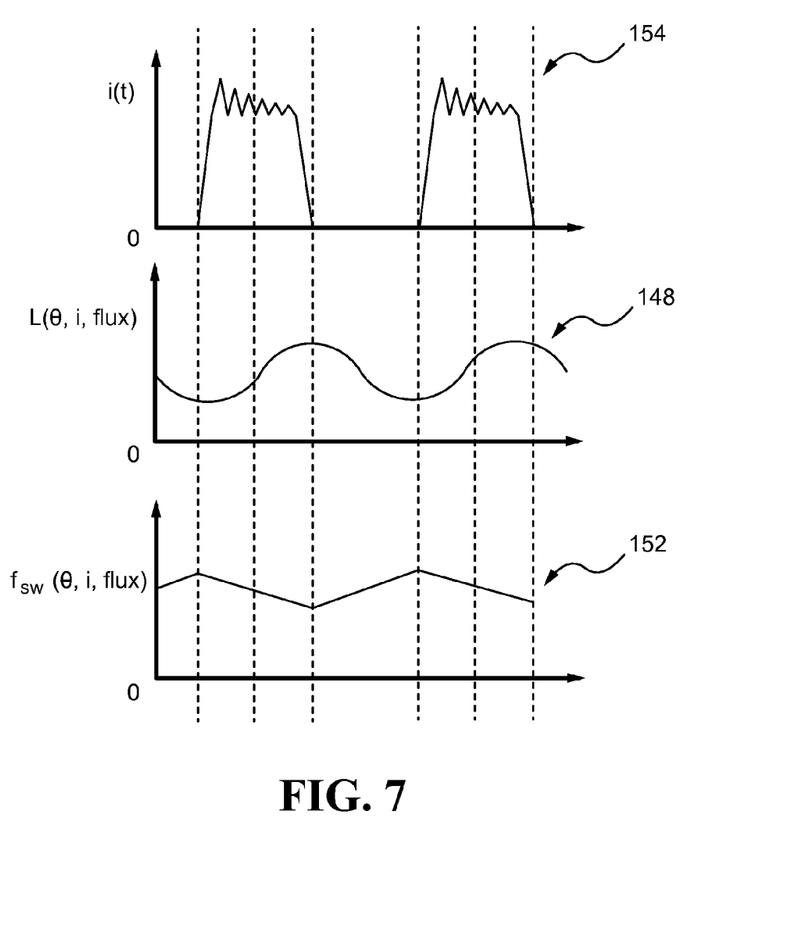
FIG. 7 are graphical views of the phase current, machine inductance and switching frequency as exhibited by the embodiment of FIG. 6.

Using the switching frequency 152 adjusted or generated during step 150-3, the controller 130 may further be configured to chop the current reference signal 140, using the PWM controller 142 for example, and generate a phase current 154, as shown in FIG. 7 for instance, during step 150-4. Additionally, the controller 130 may be configured to generate a PWM command based on the phase current command and the modulated switching frequency in step 150-5. As shown, while the frequency of the current ripples in each pulse of the phase current 154 may vary with rotor position, machine current or rotor flux, the general magnitude of the current ripples may be substantially constant throughout the pulse in contrast to those of the prior art phase current 146 shown in FIG. 4. Moreover, the average of the actual phase current 154 that is applied to each phase of the stator 118 may be more accurate and substantially more consistent with a desired phase current, thus improving machine performance without sacrificing efficiency of the electric drive 104. Furthermore, in step 150-6, the controller 130 may be configured to apply or communicate the modified phase current 154 to the appropriate phases of the SR machine 110. More specifically, the controller 130 may selectively enable and disable the appropriate switches 132 of the associated electric drive 104 according to the modified phase current 154 so as to engage each phase of the stator 118 and to rotate the rotor 116 relative thereto.

INDUSTRIAL APPLICABILITY

In general, the foregoing disclosure finds utility in various industrial applications, such as the farming, construction and mining industries in providing smoother and more efficient control of machines typically used in association with work vehicles and/or machines, such as tractors, backhoe loaders, compactors, feller bunchers, forest machines, industrial loaders, skid steer loaders, wheel loaders, and the like. The present disclosure also finds utility in various applications with stationary machines, such as windmills, hydro-electric dams, and the like.

More specifically, the disclosed control systems and methods may be applied to electric drive systems and machines having switched reluctance (SR) or other comparable machines commonly used in the art. The systems and methods disclosed herein provide means for controlling the switching frequency of SR machines in a manner which improves machine performance without introducing substantial losses in power. Moreover, the present disclosure modifies the switching frequency based on rotor position, machine current and rotor flux so as to compensate for inconsistencies in current ripples of phase currents caused by fluctuations in machine inductance.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A control system for controlling a switched reluctance (SR) machine having a rotor and a stator, the control system comprising:
   a converter circuit operatively coupled to the stator and including a plurality of switches in selective communication with each phase of the stator; and
   a controller in communication with each of the stator and the converter circuit, the controller being configured to determine a position of the rotor relative to the stator, and generate a modulated switching frequency based on the rotor position, the modulated switching frequency being modulated by increasing or decreasing the modulated switching frequency based on the rotor position.

2. The control system of claim 1, wherein machine inductance is a function of rotor position and rotor flux, the modulated switching frequency being configured to decrease when machine inductance increases and increase when machine inductance decreases.

3. The control system of claim 1, wherein a desired switching frequency for the modulated switching frequency is initially defined based on rotor speed and torque demand of the SR machine.

4. The control system of claim 1, wherein the controller is configured to determine the rotor position based on feedback from one or more sensors disposed in proximity to one or more of the rotor and a drive shaft coupled thereto.

5. The control system of claim 1, wherein the controller is configured to modulate the modulated switching frequency based on a preprogrammed function of rotor position and rotor flux.

6. The control system of claim 1, wherein the controller is configured to modulate the modulated switching frequency based on one or more preprogrammed maps correlating different optimum switching frequencies with different rotor positions.

7. The control system of claim 1, wherein the controller is further configured to apply the modulated switching frequency and a current reference signal to a pulse width modulation (PWM) controller to generate a PWM phase current signal for chopping current to at least one phase of the stator.

8. The control system of claim 1, wherein the SR machine is operating in a motoring mode of operation.

9. A method of controlling a switching frequency of a switched reluctance (SR) machine having a rotor and a stator, the method comprising the steps of:
   determining a position of the rotor relative to the stator, the rotor position being indicative of machine inductance for a given machine flux value; and
   modulating the switching frequency by increasing or decreasing the switching frequency based on the rotor position such that the switching frequency decreases when machine inductance increases and increases when machine inductance decreases.

10. The method of claim 9, further comprising the step of initially defining a desired switching frequency based on rotor speed and torque demand of the SR machine.

11. The method of claim 9, further comprising the step of determining the rotor position based on feedback from one or more sensors disposed in proximity to one or more of the rotor and a drive shaft coupled thereto.

12. The method of claim 9, wherein the switching frequency is modulated based on a preprogrammed function of rotor position and/or flux.

13. The method of claim 9, wherein the switching frequency is modulated based on one or more preprogrammed maps correlating different optimum switching frequencies with different rotor positions.

14. The method of claim 9, further comprising the steps of generating a phase current signal based on a current reference signal that is pulse width modulated (PWM) with the modulated switching frequency, and controlling current to at least one phase of the stator based on the phase current signal.

15. A method of controlling a switched reluctance (SR) machine having a rotor and a stator, the method comprising the steps of:
   determining a position of the rotor relative to the stator;
   generating a switching frequency based on the rotor position, the switching frequency being modulated by increasing or decreasing the modulated switching frequency based on the rotor position;
   generating a pulse width modulated (PWM) phase current signal based on the switching frequency and a current reference signal; and
   controlling at least one phase of the stator based on the PWM phase current signal.

16. The method of claim 15, wherein the rotor position is indicative of machine inductance, the switching frequency being configured to decrease when machine inductance increases and increase when machine inductance decreases.

17. The method of claim 15, further comprising the step of initially defining a desired switching frequency based on rotor speed and torque demand of the SR machine.

18. The method of claim 15, further comprising the step of determining the rotor position based on feedback from one or more sensors disposed in proximity to one or more of the rotor and a drive shaft coupled thereto.

19. The method of claim 15, wherein the switching frequency is modulated based on a preprogrammed function of rotor position.

20. The method of claim 15, wherein the switching frequency is modulated based on one or more preprogrammed maps correlating different optimum switching frequencies with different rotor positions.

* * * * *